United States Patent
Cheng et al.

(10) Patent No.: US 9,395,847 B2
(45) Date of Patent: Jul. 19, 2016

(54) IMAGE SENSING METHOD AND IMAGE SENSING APPARATUS

(71) Applicant: PixArt Imaging Inc., Hsin-Chu (TW)

(72) Inventors: Hsin-Chi Cheng, Hsin-Chu (TW);
Yu-Chia Lin, Hsin-Chu (TW);
Yu-Chieh Fu, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 121 days.

(21) Appl. No.: 14/160,572

(22) Filed: Jan. 22, 2014

(65) Prior Publication Data
US 2014/0300582 A1 Oct. 9, 2014

(30) Foreign Application Priority Data
Apr. 9, 2013 (TW) .............................. 102112540 A

(51) Int. Cl.
*G06F 3/042* (2006.01)
*G06F 3/041* (2006.01)

(52) U.S. Cl.
CPC .............. *G06F 3/042* (2013.01); *G06F 3/0416* (2013.01); *G06F 3/0428* (2013.01)

(58) Field of Classification Search
CPC ...... G06F 3/042; G06F 3/0416; G06F 3/0428
See application file for complete search history.

(56) References Cited

U.S. PATENT DOCUMENTS

| 5,499,098 A * | 3/1996 | Ogawa .................... G01D 5/34 250/222.1 |
| 2006/0087565 A1 | 4/2006 | Okamoto |
| 2006/0119903 A1 | 6/2006 | Chiba |
| 2008/0095459 A1 | 4/2008 | Vitsnudel |
| 2009/0219424 A1 * | 9/2009 | Sonoda .................. H04N 5/361 348/302 |
| 2009/0316010 A1 | 12/2009 | Nomura |
| 2010/0295980 A1 * | 11/2010 | Chan .................... G06F 3/0428 348/308 |
| 2013/0120626 A1 | 5/2013 | Chan |

FOREIGN PATENT DOCUMENTS

TW 201042521 12/2010

* cited by examiner

*Primary Examiner* — Ilana Spar
*Assistant Examiner* — Mihir K Rayan
(74) *Attorney, Agent, or Firm* — Winston Hsu; Scott Margo

(57) ABSTRACT

Disclosed is an image sensor comprising: an image sensing unit array, for sensing an object and comprising a plurality of image sensing units arranged in a sensing matrix with M rows and N columns; an image data reading circuit, for reading and outputting image data caught by at least part of the image sensing units; and a control unit, for controlling numbers and locations of the image sensing units for each row or each column, from which the image data reading circuit reads the image data; for computing a read region that is in the image sensing unit array and corresponds to the object; and for controlling the image data reading circuit to read at least part of the image data of the column or the row. The part of the column or the row, which is read, comprises the read region.

10 Claims, 11 Drawing Sheets ature of the Invention
IMAGE SENSING METHOD AND IMAGE SENSING APPARATUS

BACKGROUND OF THE INVENTION

1. Field of the Invention

The present invention relates to an image sensing method and an image sensor, and particularly relates to image sensing method and an image sensor which can read image data from read regions with different shapes.

2. Description of the Prior Art

FIG. 1 is a schematic diagram illustrating a prior art optical touch control apparatus. As shown in FIG. 1, the optical touch control apparatus 100 comprises a touch control panel 101, an image sensor 102, light guiding devices 105, 109 with bar shapes and photo diodes 103, 107, 111, 113. The light guiding devices 105, 109 are provided at two sides of the touch control panel 101. The photo diodes 103, 107, 111, 113 are respectively provided at the endings of the light guiding devices 105, 109, to project light to the touch control panel 101 via the light guiding devices 105, 109. The image sensor 102 is provided opposite to the light guiding devices 105, 109. If an object Ob (ex. user's finger) moves on the touch control panel 101, the image sensor 102 can sense the projection image for the object image Ob, which means the dark region generated via shading light from the light guiding devices 105, 109 by the object Ob. The location for the object Ob is computed accordingly.

The image sensor 102 can comprise a pixel array 120 and an image data reading circuit 122, as shown in FIG. 2 and FIG. 3. The data reading circuit 120 senses the image and generates the image data. The image data reading circuit 122 reads the image data generated by the pixel array 120. Please refer to FIG. 2, which illustrates a projection image for an ideal object track on the image sensor 102 in FIG. 1. The ideal state here means no error or skew occurs when the touch control panel 101 and the image sensor 102 are fabricated. In such case, the light guiding devices 105, 109 present a rectangular bright background on the pixel array 120 as shown in FIG. 2. The movement for the object on the touch control panel generates dark region to the bright background, therefore the bright background can be regarded as a possible moving track for the object Ob. However, practically the product has assembly tolerance, such that the error or skew may occurs when the touch control panel 101 and the image sensor 102 are fabricated. In such case, the moving track Obt' for the object Ob on the pixel array 120 is an oblique parallelogram as shown in FIG. 3.

The image data reading circuit 122 always reads the data of the pixel array 120 row by row or column by column. Therefore, the example in FIG. 2 only needs to read image data of the pixel rows in the moving track Obt to acquire the location of the object Ob. However, the example in FIG. 3 needs to read image data of all pixel rows or all pixel columns to acquire the image data for all pixels in the moving track Obt' to acquire the location of the object Ob. In such case the image data reading circuit 122 needs much time to read the image data.

SUMMARY OF THE INVENTION

Therefore, one purpose of the present invention is to provide an image sensing method and an image sensor, which can read the image data of the read region via reading the image data for only part of the rows or the columns, to decrease data reading amount of the image data.

One embodiment of the present invention discloses an image sensor, which comprises: an image sensing unit array, for sensing an object and comprising a plurality of image sensing units arranged in a sensing matrix with M rows and N columns; an image data reading circuit, for reading and outputting image data caught by at least part of the image sensing units; and a control unit, for controlling numbers and locations of the image sensing units for each row or each column, from which the image data reading circuit reads the image data; for computing a read region that is in the image sensing unit array and corresponds to the object; and for controlling the image data reading circuit to read at least part of the image data of the column or the row. The part of the column or the row, which is read, comprises the read region.

Still another embodiment of the present invention discloses an image sensing method, comprising: computing a read region, which is for sensing an object and is in the image sensing unit array comprising a plurality of image sensing units arranged in a sensing matrix with M rows and N columns; and reading at least one part of the column or the row, wherein the part of the column or the row, which is read, comprises the read region.

In view of above-mentioned embodiments, the present invention can read the image data of the read region via only part image data for rows or columns. Therefore, it does not need to read all regions for the pixel array, or to read a region that is larger than the read region, thereby the time for reading the image data can be decreased. Additionally, the present invention provides a mechanism to select the column-wise method or the row-wise method to read the image data based on the numbers of rows and columns. By this way, the operation for reading the image data can be more efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
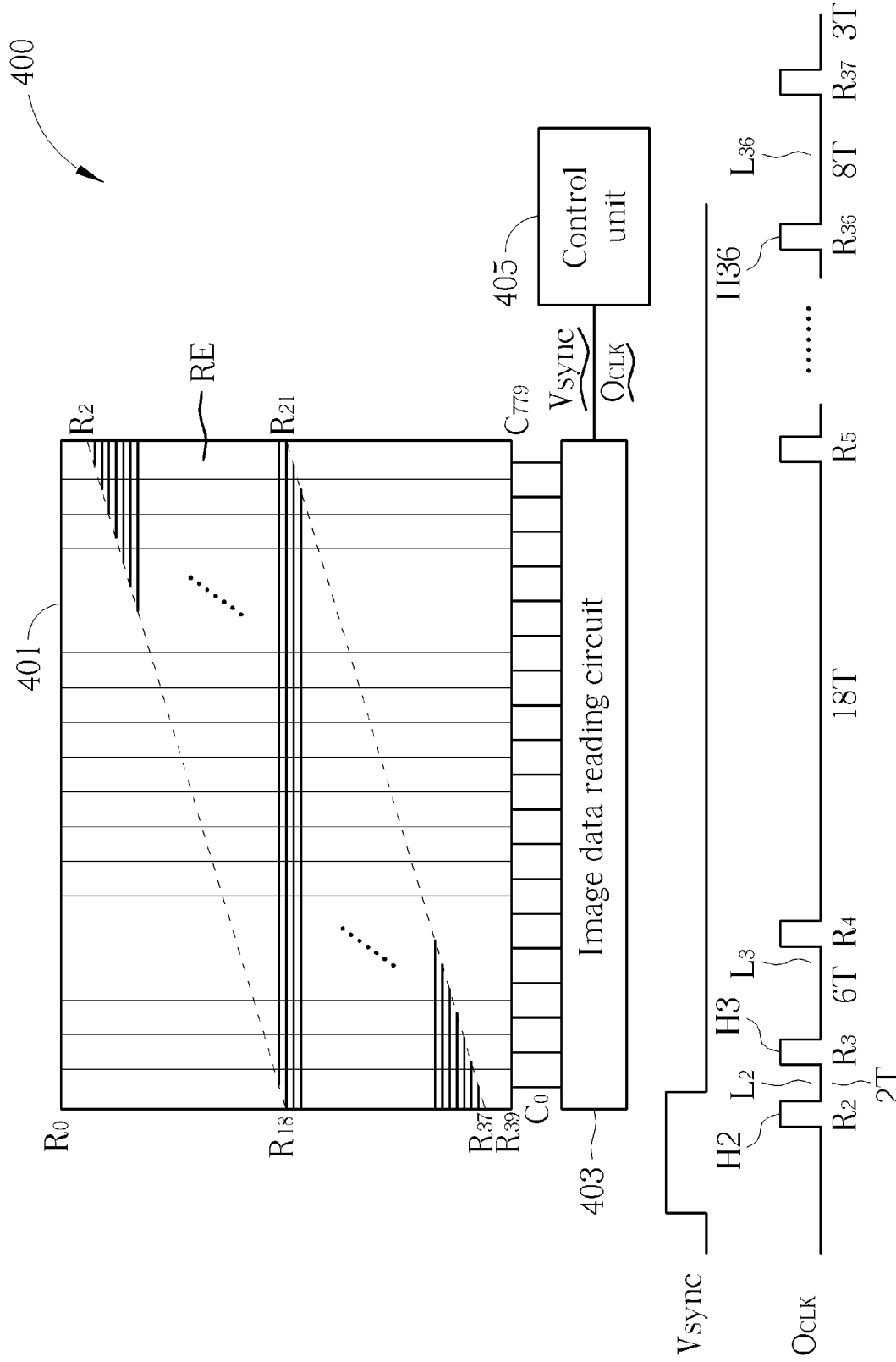
FIG. 4 to FIG. 10 are schematic diagrams illustrating image sensors according to different embodiments of the present invention.

FIG. 4 to FIG. 10 are schematic diagrams illustrating image sensors according to different embodiments of the present invention. As shown in FIG. 4, the image sensor 400 comprises a pixel array 401, an image data reading circuit 403 and a control unit 405. The image sensing unit array 401 senses an object (ex. a finger) and comprises a plurality of pixels arranged in a sensing matrix with M rows and N columns. The following embodiments are explained in the condition that M is smaller than N, but pleases note the N can be smaller than M. Also, the pixel array 401 can be replaced with other types of image sensing unit array, and the pixels can be replaced with the image sensing units in the image sensing unit array. The image data reading circuit 403 reads and outputs image data caught by at least part of the image sensing units. The control unit 405 controls numbers and locations of the image sensing units for each row or each column, from which the image data reading circuit 403 reads the image data. Also, the control unit 405 computes a read region that is in the image sensing unit array and corresponds to the object (i.e. the region that the projection image of the object locates). Additionally, the control unit 405 controls the image data reading circuit 403 to read at least part of the image data of the column or the row. The part of the column or the row, which is read, comprises the read region.

Take FIG. 4 for example, the control unit 405 computes the read region RE via computing at least one read slope. For example, the pixel array 401 comprises 40 rows and 780 columns and detects that the read region starts at a nineteenth pixel row $R_{18}$ at the left side, and starts at a third pixel row $R_2$ at the right side, thus a read slope can be acquired via the equation 3−19/780=−0.0205. Also, if it is known that the read region RE contains 20 rows, such that it can be acquired that the read region ends at a 38th pixel row $R_{37}$ at the left side, and ends at a 22nd pixel row $R_{21}$ at the right side. By this way the read region can be obtained. The read region corresponding to the object may have an irregular shape, such that a plurality of rectangles and parallelograms can be utilized to contain the read region. Please note the rectangles and parallelograms are only for example and do not mean to limit the scope of the present invention. Many methods can be utilized to know how many rows that the read region contains. For example, the image data reading circuit 403 reads the image data according to the read clock signal $O_{CLK}$ in FIG. 4, thus a number of the rows that the read region RE contains can be computed according to the timing of the read clock signal $O_{CLK}$. Alternatively, the number of the rows that the read region RE contains can be acquired depending on the spec of the pixel array 401 or the image data reading circuit 403. Besides computing the read slope as above-mentioned description, a background image can be caught to obtain the bright region generated by a light source. After that, one or more read regions are allocated depending on the bright region such that the read region can be formed. Please note the method for computing the read region is not limited to the above-mentioned methods. For example, a bit map can be utilized to compute the read region RE.

After getting the read region RE, the control unit 405 can accordingly read image data in the read region RE. For example, if it is computed that only two rightmost pixels of the 3rd pixel row $R_2$ are contained in the read region RE, the control unit 405 can control the image data reading circuit 403 to read only the two rightmost pixels of the 3rd pixel row $R_2$ rather than all pixels of the 3rd pixel row $R_2$. Similarly, if it is computed that the 1st-10th pixels from left to right of the 22nd pixel row $R_{21}$ are not contained in the read region RE, the control unit 405 can control the image data reading circuit 403 not to read the 1st-10th pixels from left to right of the 22nd pixel row $R_{21}$. As above-mentioned, the image data reading circuit 403 reads the image data according to the read clock signal $O_{CLK}$ in FIG. 4. In one embodiment, the high level of the read clock signal $O_{CLK}$ triggers the read operation and the image data reading circuit 403 reads the image data when the read clock signal $O_{CLK}$ has a low level. For example, after the read operation for the 3rd pixel row $R_2$ is triggered by the high level of the read clock signal $O_{CLK}$ (the time interval $H_2$), the image data reading circuit 403 reads the image data of the 3rd pixel row $R_2$ when the read clock signal $O_{CLK}$ has low level (the time interval $L_2$). In FIG. 4 the symbol 2T marked at the low level at which the image data of the 3rd pixel row $R_2$ is read indicates image data of two pixels are read. Similarly, after the read operation for the 37th pixel row $R_{36}$ is triggered by the high level of the read clock signal $O_{CLK}$ (the time interval $H_{36}$), the image data reading circuit 403 reads the image data of the 37th pixel row $R_{36}$ when the read clock signal $O_{CLK}$ has low level (the time interval $L_{36}$). In FIG. 4 the symbol 8T marked at the low level at which the image data of the 37th pixel row $R_{36}$ is read indicates image data of eight pixels are read. However, the above-mentioned operation can be reversed (i.e. triggered by a low level and read image data at a high level). Besides, the read clock signal $O_{CLK}$, the image data reading circuit 403 can further refer to a vertical sync signal $V_{sync}$. For example, the read operation is performed when the vertical sync signal $V_{sync}$ has a low level.

Many mechanisms can be applied to the read operation such that the image data reading circuit 403 can only read the image data from desired pixels rather than all the pixels. For example, the patent application with a publication number US 2010/0295980 has disclosed a mechanism that the image data reading circuit 403 utilizes at least one multiplexer to read the image data from desired pixels. Such mechanism can be applied to the present invention, but not limited.

Figure 5:
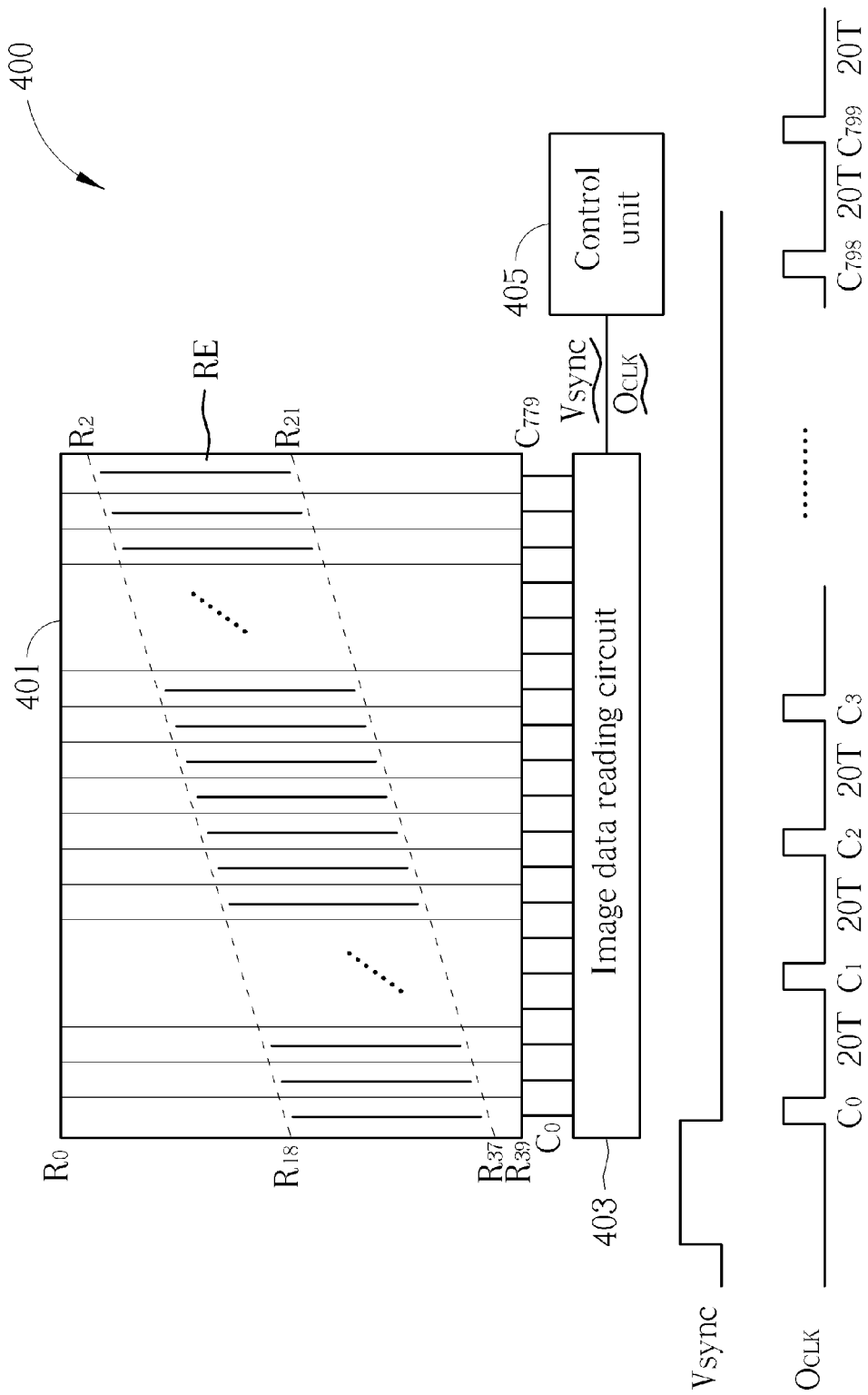

In the embodiment of FIG. 4, the image data in the read region RE is read by row-wise. The read region RE in FIG. 5 has the same size as which in FIG. 4, but the image data in the read region RE is read by column-wise. As shown in FIG. 5, the image data reading circuit 403 is triggered by the high level of the output clock signal $O_{CLK}$ when the vertical sync signal $V_{sync}$ has a low level, and reads the image data of pixel columns $C_0$-$C_{799}$ when the output clock signal $O_{CLK}$ has a low level. The numbers for the pixel which are read in each pixel column in the read region RE in FIG. 5 are all 20, since the read region RE is a parallelogram. The image data of the read region RE can be read by row-wise or column wise depending on different requirements. As above-mentioned, the pixel array 401 is a sensing matrix with M rows and N columns. Therefore, in one embodiment, the control unit 405 controls the image data reading circuit 403 to read the image data in the read region RE by row-wise if the M is smaller than N. The control unit 405 controls the image data reading circuit 403 to read the image data in the read region RE by column-wise if the M is larger than N. Either the row-wise method or the column-wise method needs a synchronizing signal to trigger, for example, the $H_{sync}$, but it may changes to $V_{sync}$ depending on the situations. Therefore, more row or columns are read, more synchronizing signals are needed, such that more time is needed to perform the read operation. Accordingly, the column-wise method needs less synchronizing signals if M is larger than N (i.e. the number of rows is larger than the number of columns). For example, if M=1000 and N=100, the row-wise method needs 1000 synchronizing signals, but only 100 synchronizing signals are needed for the column-wise method. Thereby the image data reading circuit 403 can use less times of read operations to read the image data in the read region RE such that the read time can be saved. By this way, less time is needed to read each frame, thus the frame rate for image processing can be increased.

Figure 6:
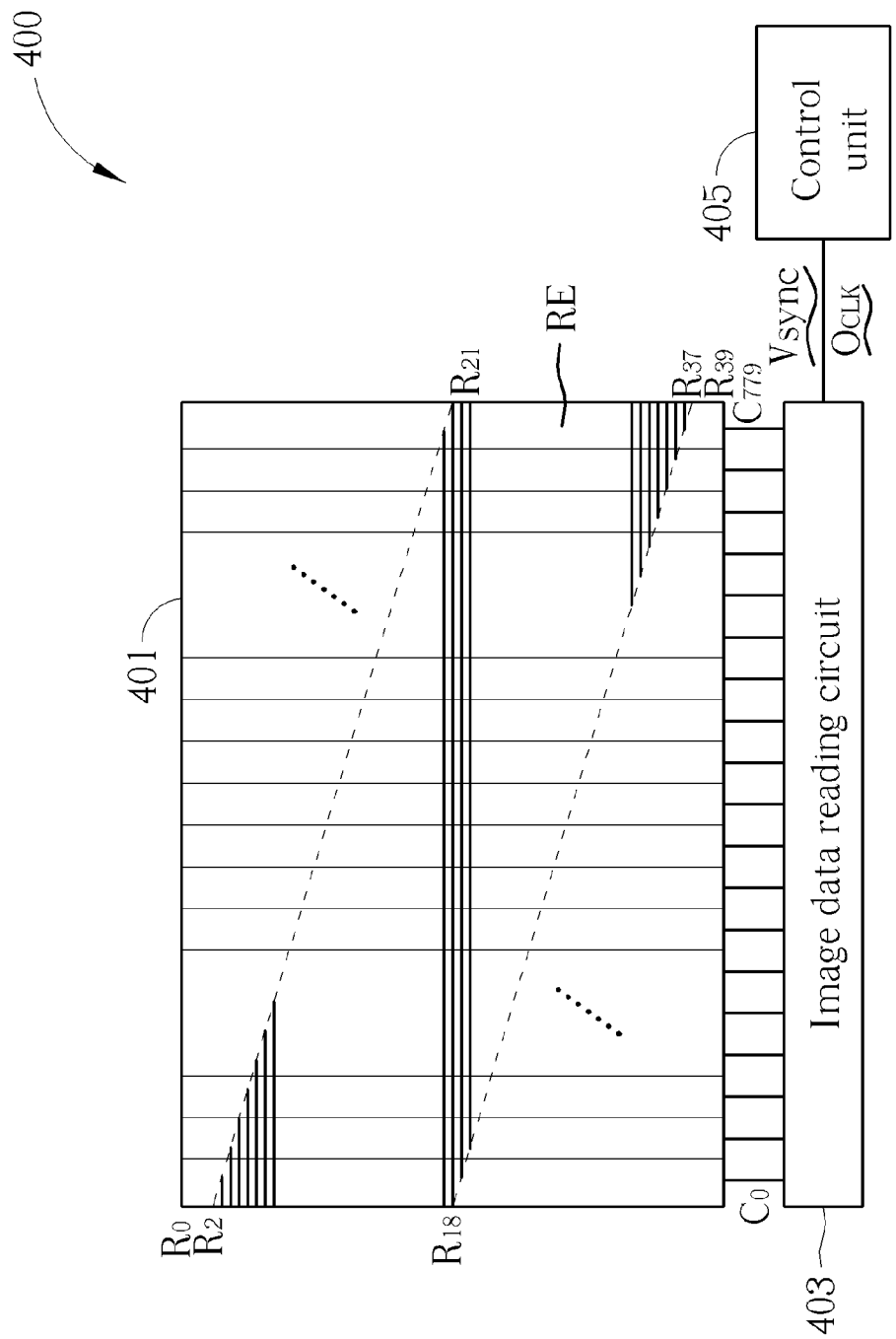
Figure 7:
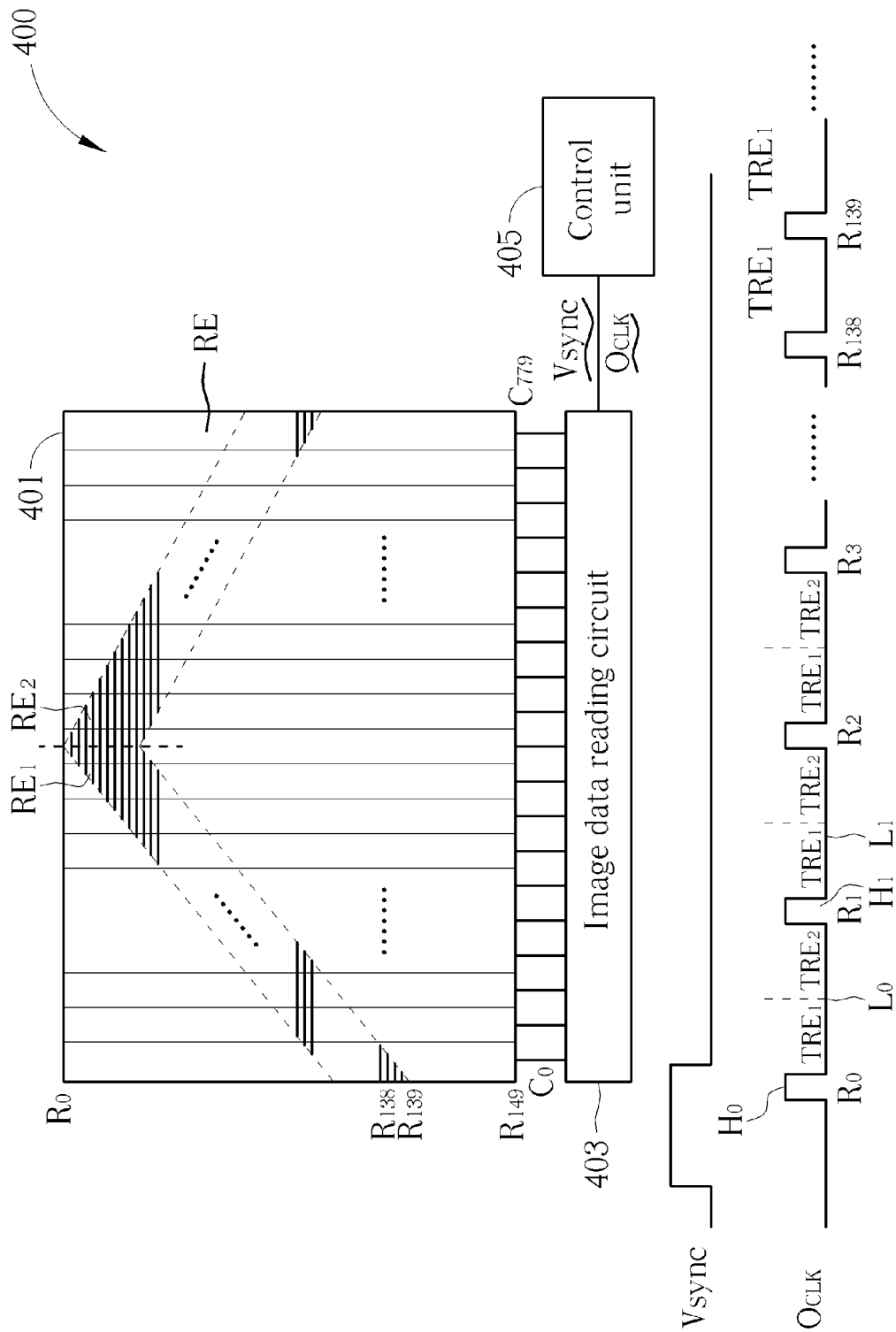

Besides the parallelograms in FIG. 4 and FIG. 5, the read region can be other shapes. For example, a parallelogram with other slopes, a V shape, an inverted V shape, a polygon with K sides, wherein the K is a positive integer larger than 3. That is, besides the parallelogram, the V shape, and the inverted V shape, the read region can be other regular or non-regular polygons (ex. quadrangle, pentagon, hexagon), which will be described in the following description. In the embodiment of FIG. 6, the read region RE is also a parallelogram, but the slops for the upper edge and the bottom edge are opposite to which of the parallelogram in FIG. 4 and FIG. 5. In the embodiment of FIG. 6, the mechanism that the control unit 405 utilizes to compute the read region RE and the mechanism that the image data reading circuit 403 utilizes to read image data of desired pixels are the same as which for above-mentioned embodiments, thus are omitted for brevity here. In the embodiment of FIG. 7, the read region is an inverted V shape with a first read region $RE_1$ and a second read region $RE_2$. Similar with the above-mentioned embodiment, the control unit 405 controls the image data reading circuit 403 to read the image data in the read regions $RE_1$, $RE_2$ when the read clock signal $O_{CLK}$ has a low level. The control unit 405 separates each low level region of the read clock signal $O_{CLK}$ to a first read region time interval $TRE_1$ and a second read region time interval $TRE_2$. The image data reading circuit 403 reads image data for the pixels of the first read region $RE_1$ in the first read region time interval $TRE_1$, and reads image data for the pixels of the second read region $RE_2$ in the second read region time interval $TRE_2$. If the control unit 405 computes the read region via computing the read slope as above-mentioned description, more than one read slops must be computed. For example, at least one first read slope can be computed to define the first read region time interval $TRE_1$, and at least one second read slope can be computed to define the second read region time interval $TRE_2$.

In the embodiment of FIG. 7, the image data reading circuit 403 reads image data for a single pixel row in a single period of the read clock signal $O_{CLK}$. The single period here comprise the high level time interval for triggering and the low level time interval for reading data. For example, the read clock signal $O_{CLK}$ has a high level in the time interval $H_0$, to trigger the reading operation for the pixel row $R_0$. Besides, the read clock signal $O_{CLK}$ has a low level in the time interval $L_0$, in which the image data of the pixel row $R_0$ is read. The single period of the read clock signal $O_{CLK}$ comprises the time interval $H_0$ and the time interval $L_0$. Similarly, the time interval $H_1$ for triggering the reading operation for the pixel row $R_1$ and the time interval $L_1$ in which the image of the pixel row $R_1$ is read form a single period of the read clock signal $O_{CLK}$ as well. The image data reading circuit 403 reads image data for a single pixel row in a single period of the read clock signal $O_{CLK}$. For example, in the single period comprising the time intervals $H_0$ and $L_0$, the image data reading circuit 403 reads the image data for the pixel $R_0$ in the first read region $RE_1$ in the first read region time interval $TRE_1$, and reads the image data for the pixel $R_0$ in the second read region $RE_2$ in the second read region time interval $TRE_2$. Similarly, in the single period comprising the time intervals $H_1$ and $L_1$, the image data reading circuit 403 reads the image data for the pixel $R_1$ in the first read region $RE_1$ in the first read region time interval $TRE_1$, and reads the image data for the pixel $R_1$ in the second read region $RE_2$ in the second read region time interval $TRE_2$. Since the first read region $RE_1$ comprises the pixel rows $R_{138}$ and $R_{139}$ but the second read region $RE_2$ does not comprise the pixel rows $R_{138}$ and $R_{139}$, the single period for the read clock signal $O_{CLK}$ corresponding only comprises the first read region time interval $TRE_1$. The embodiment in FIG. 7 can read the image in column-wise, as above-mentioned. Also, the embodiment in FIG. 7 can select the column-wise method or the row-wise method depending on the numbers for rows and columns.

Figure 1:
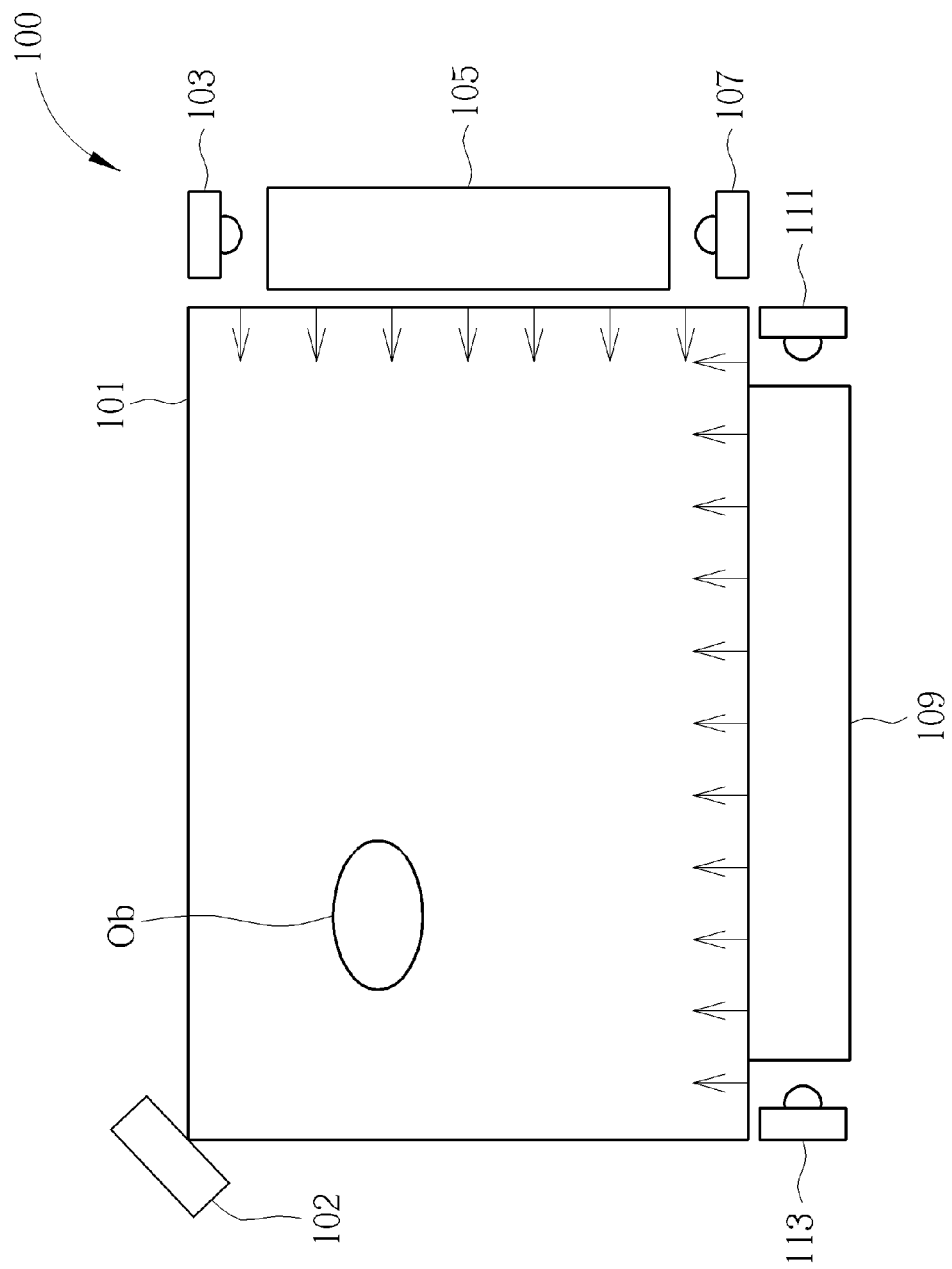
FIG. 1 is a schematic diagram illustrating a prior art optical touch control apparatus.
Figure 2:
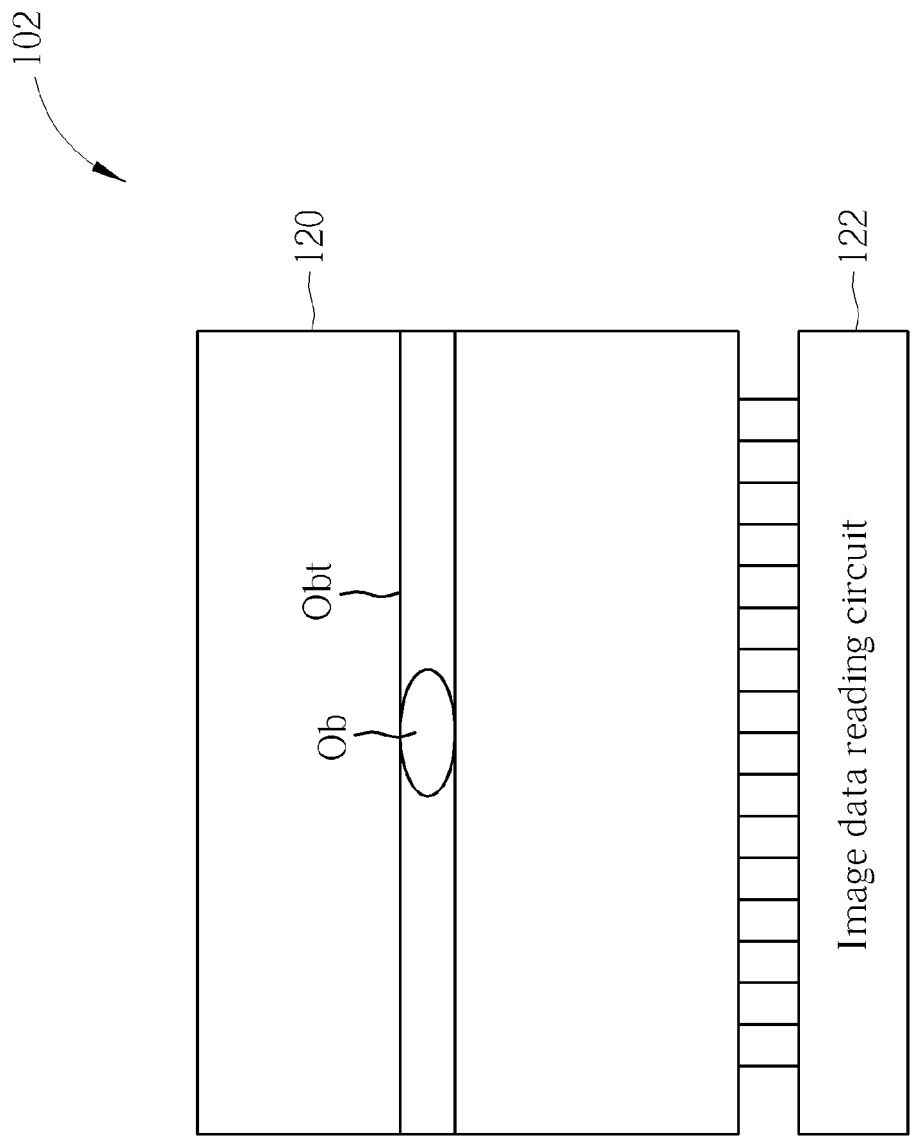
FIG. 2 is a schematic diagram illustrating a projection image for an ideal object track on the image sensor in FIG. 1.
Figure 3:
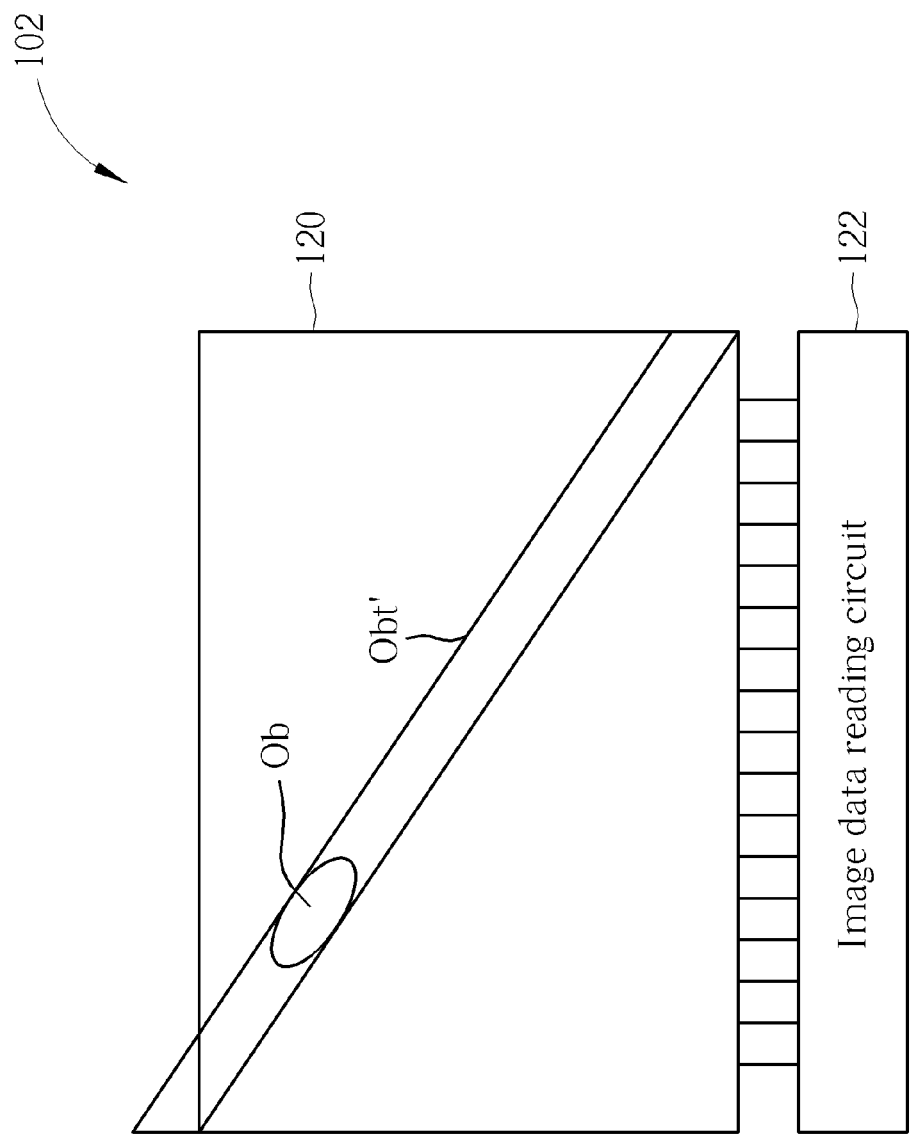
FIG. 3 is a schematic diagram illustrating a projection image for an object track having error on the image sensor in FIG. 1.
Figure 8:
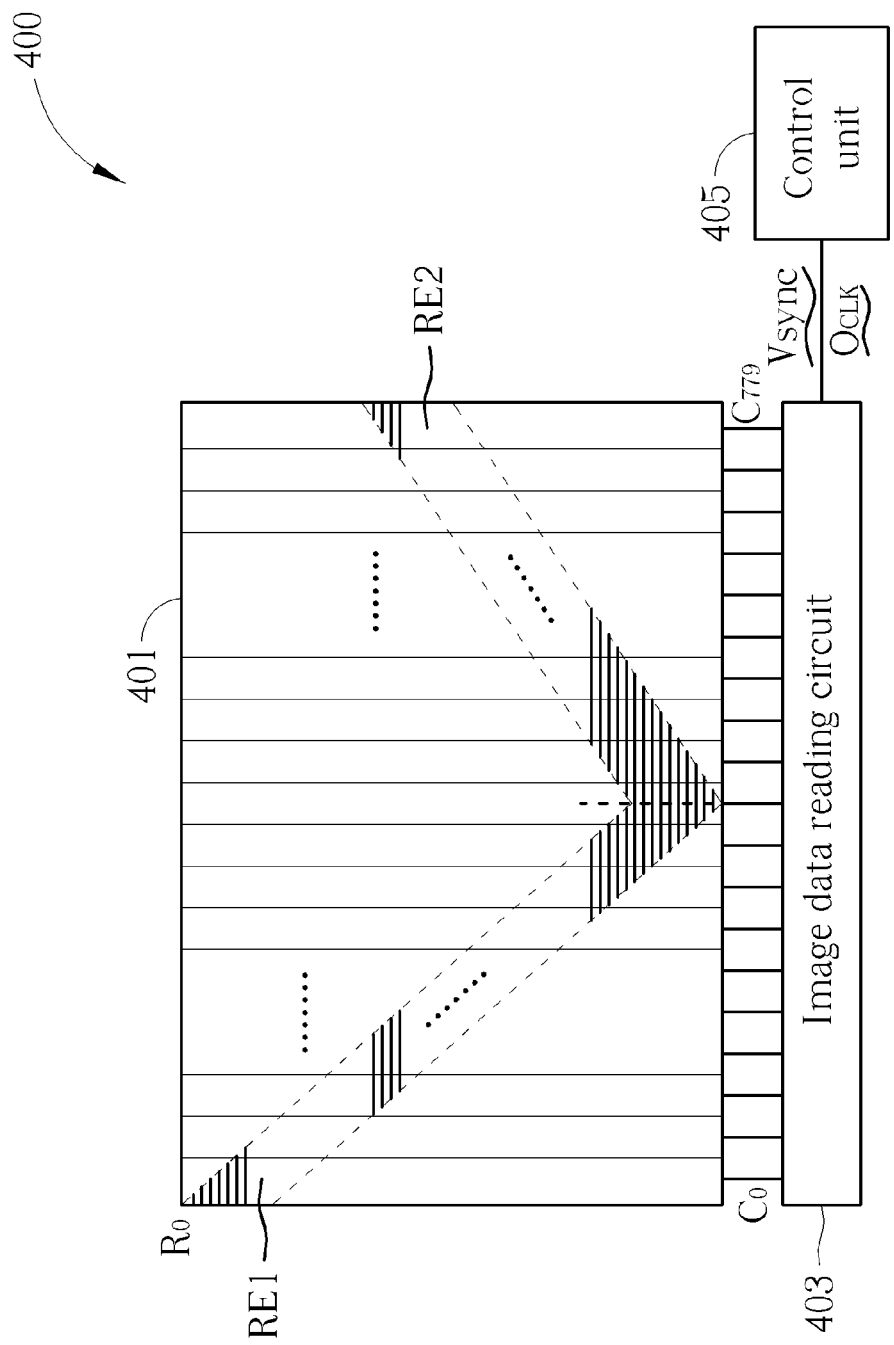
Figure 9:
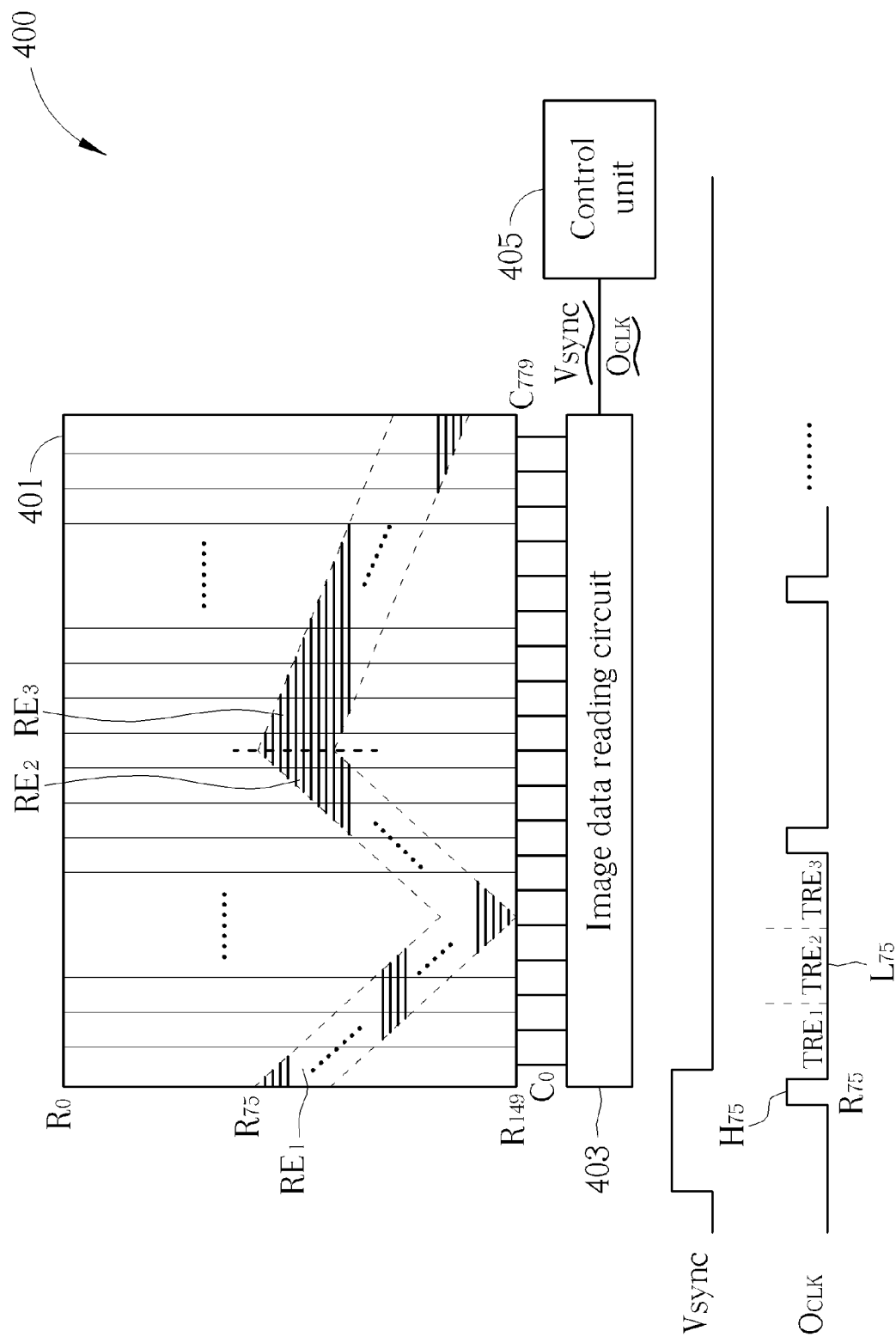
Figure 10:
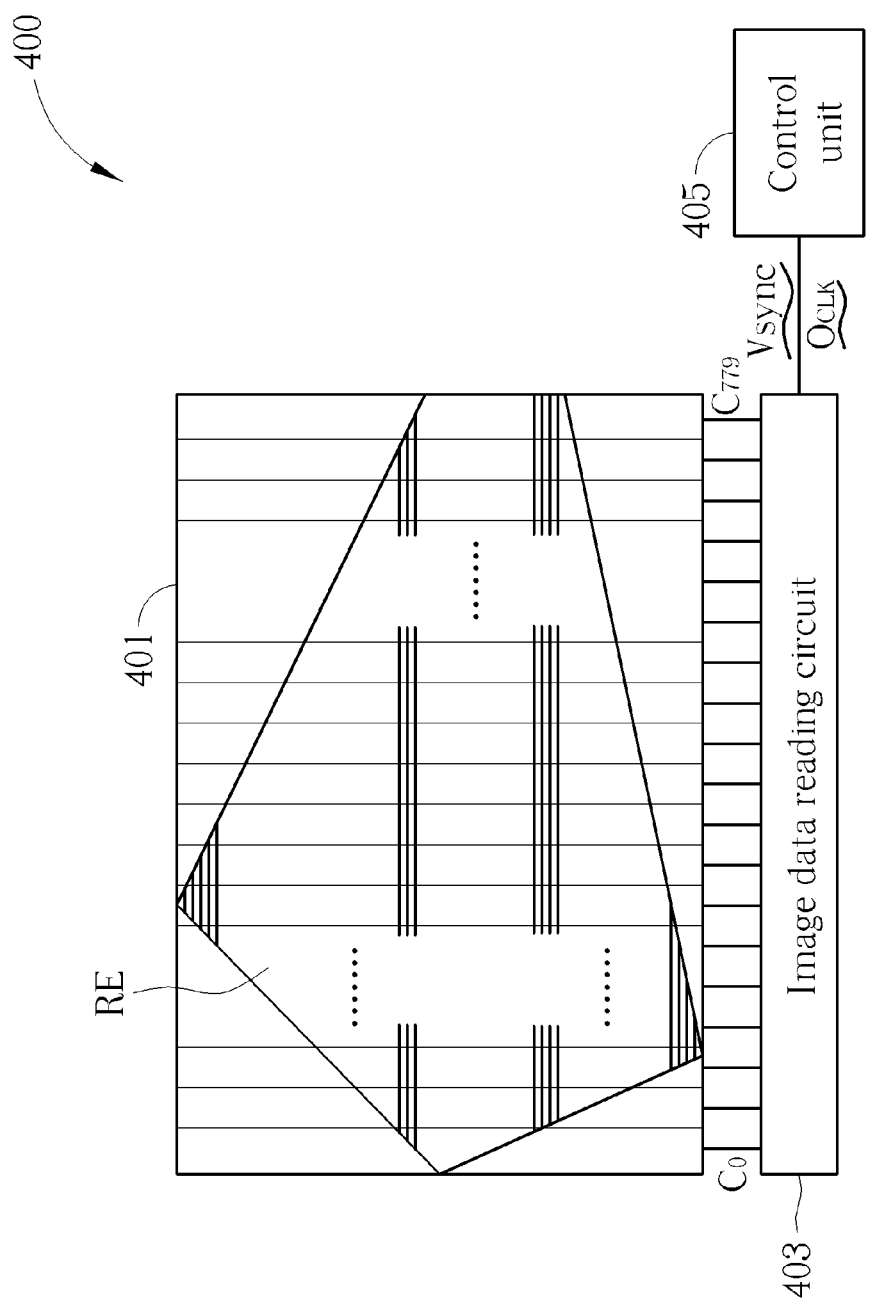

In the embodiment of FIG. 8, the read region also comprises a first read region $RE_1$ and a second read region $RE_2$, which form a read region with an inverted V shape. In FIG. 8, the operation for the control unit 405 to compute the read region and the operation for the image data reading circuit 403 to read the image data is the same as which of FIG. 7, thus it is omitted for brevity here. In the embodiment of FIG. 9, the read region comprises a first read region $RE_1$, a second read region $RE_2$ and a third read region $RE_3$. In such case, the operation for the control unit 405 to compute the read region is the same as which for the embodiment in FIG. 7, but the control unit 405 needs to particularly allocate time for reading the third read region $RE_3$ for a single period of the read clock signal $O_{CLK}$. For example, the low level time interval $L_{75}$ for reading the pixel row $R_{75}$. In the embodiment of FIG. 10, the read region RE is a pentagon, and the control unit 405/image data reading circuit 403 can utilize the operation described in the embodiments of FIG. 4, FIG. 5 to compute the read region and to read the image data. Please note the above-mentioned embodiments are only for example to explain the present invention, but do not meant that the scope of the present invention is limited to the read regions with the above-mentioned shapes. The above-mentioned mechanism according to the present invention can be applied to read regions with any other shape. Additionally, the above-mentioned image sensor is not limited to the optical touch control apparatus in FIG. 1, but also can be applied to any other electronic apparatus.

Figure 11:
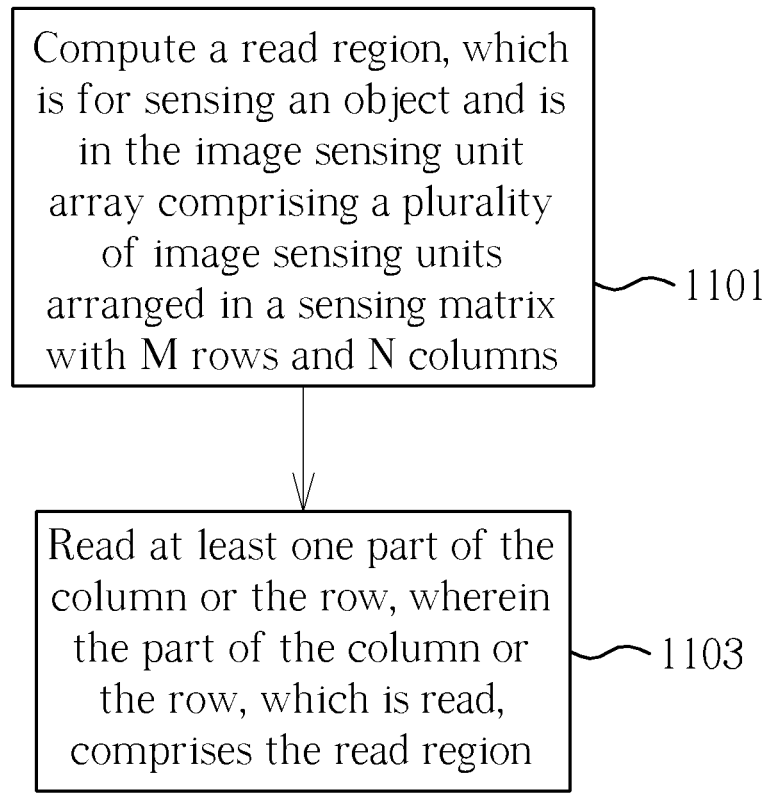
FIG. 11 is a flow chart illustrating an image sensing method according to an embodiment of the present invention.

In view of above-mentioned embodiments, the image sensing method in FIG. 11 can be acquired, which comprises the following steps:

Step 1101

Compute a read region, which is for sensing an object and is in the image sensing unit array comprising a plurality of image sensing units arranged in a sensing matrix with M rows and N columns.

Step 1103

Read at least one part of the column or the row, wherein the part of the column or the row, which is read, comprises the read region.

Other detail characteristics can be acquired in view of above-mentioned embodiments, thus are omitted for brevity here.

In view of above-mentioned embodiments, the present invention can read the image data of the read region via only part image data for rows or columns. Therefore, it does not need to read all the pixel array, or to read a region that is larger than the read region, thereby the time for reading the image data can be decreased. Additionally, the present invention provides a mechanism to select the column-wise method or the row-wise method to read the image data based on the numbers of rows and columns. By this way, the operation for reading the image data can be more efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image sensor, comprising:
an image sensing unit array, for sensing an object and comprising a plurality of image sensing units arranged in a sensing matrix with M rows and N columns;
an image data reading circuit, for reading and outputting image data caught by at least part of the image sensing units; and
a control unit,
for controlling numbers and locations of the image sensing units for each row or each column, from which the image data reading circuit reads the image data;

for computing relations between a read region and each the row or each the column, wherein the read region in the image sensing unit array and corresponds to the object; and for controlling the image data reading circuit to read at least part of the image data of the column or the row according to the relations;

wherein the control unit controls the image data reading circuit to read the image data of the read region in a first level region of a read clock signal;

where the read region comprises a first read region and a second read region, and the control unit separates the first level region to a first read region time interval and a second read region time interval;

wherein the image data reading circuit reads the image data for the image sensing units of the first read region in the first read region time interval, and the image data reading circuit reads the image data for the image sensing units of the second read region in the second read region time interval;

wherein, if the M is larger than the N, the image sensing units from which the image data reading circuit read the image data in a single period of the first read region time interval, and the image sensing units from which the image data reading circuit read the image data in a single period of the second read region time interval, are the image sensing units in the same row.

2. The image sensor of claim 1, wherein the control unit controls the image data reading circuit to read the image data in the read region by row-wise if the M is smaller than N; where the control unit controls the image data reading circuit to read the image data in the read region by column-wise if the M is larger than N.

3. The image sensor of claim 1, wherein the control units computes at least one read slope according to an image of the object, and computes the read region according to the read slope.

4. The image sensor of claim 1, wherein the read region is one of the following shapes: a parallelogram, a V shape, an inverted V shape, a polygon with K sides, wherein the K is a positive integer larger than 3.

5. An image sensing method, applied to an image sensing unit array comprising a plurality of image sensing units arranged in a sensing matrix with M rows and N columns, comprising:

computing relations between a read region and each the row or each the column, wherein the read region is for sensing an object and is in the image sensing unit array;

reading at least one part of the column or the row according to the relations;

reading the image data of the read region in a first level region of a read clock signal, wherein the read region comprises a first read region and a second read region;

separating the first level region to a first read region time interval and a second read region time interval;

reading the image data for the image sensing units of the first read region in the first read region time interval; and reading the image data for the image sensing units of the second read region in the second read region time interval;

wherein, if the M is larger than the N, the image sensing units from which the image data is read in a single period of the first read region time interval, and the image sensing units from which the image data is read in a single period of the second read region time interval, are the image sensing units in the same row.

6. The image sensing method of claim 5, further comprising:

reading the image data in the read region by row-wise if the M is smaller than N; and reading the image data in the read region by column-wise if the M is larger than N.

7. The image sensing method of claim 5, further comprising computing at least one read slope according to an image of the object, and computing the read region according to the read slope.

8. The image sensing method of claim 5, wherein the read region is one of the following shapes: a parallelogram, a V shape, an inverted V shape, a polygon with K sides, wherein the K is a positive integer larger than 3.

9. An image sensor, comprising:

an image sensing unit array, for sensing an object and comprising a plurality of image sensing units arranged in a sensing matrix with M rows and N columns;

an image data reading circuit, for reading and outputting image data caught by at least part of the image sensing units; and a control unit, for controlling numbers and locations of the image sensing units for each row or each column, from which the image data reading circuit reads the image data;

for computing a read region that is in the image sensing unit array and corresponds to the object; and for controlling the image data reading circuit to read at least part of the image data of the column or the row;

wherein the part of the column or the row, which is read, comprises the read region;

wherein the read region comprises a first read region and a second read region, wherein the control units computes a first read slope and a second read slope according to the image of the object, computes the first read region according to the first read slope, and computes the second read region according to the second read slope.

10. An image sensing method, comprising:

computing a read region, which is for sensing an object and is in the image sensing unit array comprising a plurality of image sensing units arranged in a sensing matrix with M rows and N columns; and reading at least one part of the column or the row, wherein the part of the column or the row, which is read, comprises the read region;

wherein the read region comprises a first read region and a second read region, wherein the image sensing method comprises computing a first read slope and a second read slope according to the image of the object, computing the first read region according to the first read slope, and computing the second read region according to the second read slope.

* * * * *